May 22, 1934.  M. C. SPENCER  1,959,391
SELF STARTING SYNCHRONOUS MOTOR
Filed April 7, 1932

Inventor,
Millard Cole Spencer,
By Samuel W. Balch
Attorney.

Patented May 22, 1934

1,959,391

UNITED STATES PATENT OFFICE 1,959,391

SELF-STARTING SYNCHRONOUS MOTOR

Millard Cole Spencer, East Orange, N. J.

Application April 7, 1932, Serial No. 603,703

3 Claims. (Cl. 172—275)

The object of this invention is to provide a compact alternating-current dynamo-electric machine, and more particularly to provide a self-starting motor which will run in synchronism, and which is suitable for driving clocks.

In the accompanying sheet of drawings which forms a part of this description,

Figure 1:
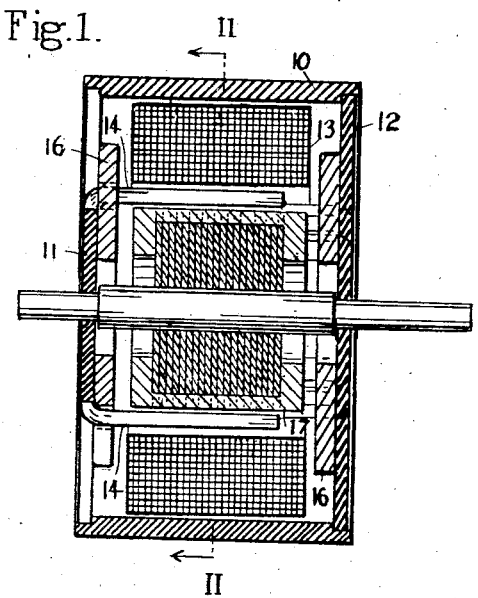
Fig. 1 is a section through the axis of the machine on the line I—I of Fig. 2.
Figure 2:
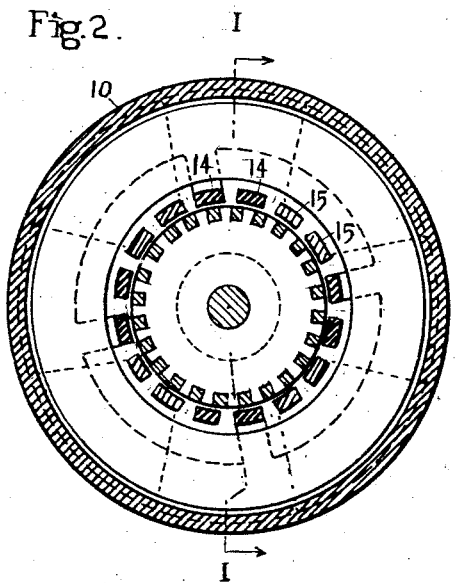
Fig. 2 is a transverse section on the line II—II of Fig. 1.
Figure 3:
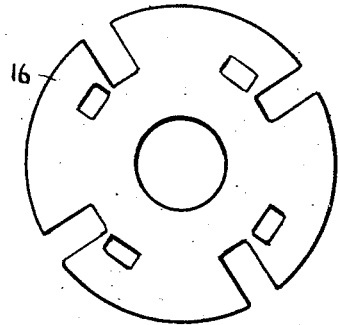
Fig. 3 is a plan of one of the closed circuiting means which is provided around alternate poles.
Figure 4:
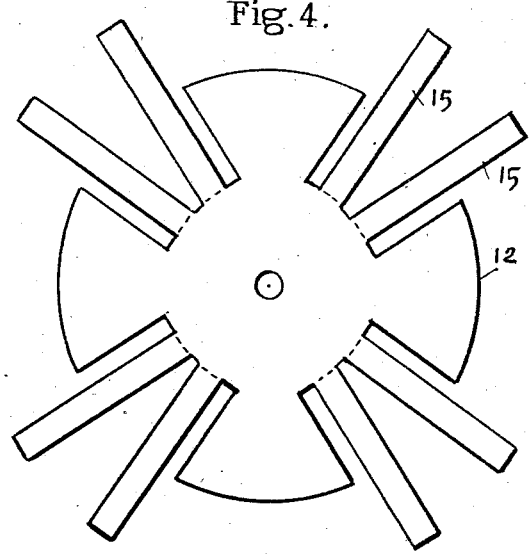
Fig. 4 is a plan of a blank from which the ends of the stator casing and the pole pieces are formed.
Figure 5:
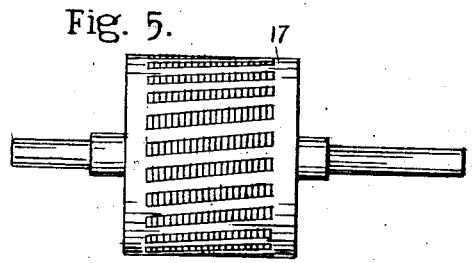
Fig. 5 is a view of the rotor.

The machine comprises a stator casing with an enclosing cylindrical portion 10 and end caps 11 and 12 which form a part of the magnetic circuit. A single stator coil 13 is enclosed by the casing. Pole pieces 14 inwardly project in pairs from the end cap 11 and pole pieces 15 inwardly project in pairs from the end cap 12. The two sets of pole pieces lie beside each other in an axial direction. They are conveniently formed as integral parts of the blanks for the caps and bent over, but this integral construction is not essential. Means are provided for a closed circuit around one pole piece of each pair and alternating pole pieces of the series. This consists in a copper plate 16 with perforations through which the pole pieces project around which closed circuits are provided. The other pole pieces lie in notches. One blank serves for all of the pole pieces from one of the end caps, but this is not essential. There is therefore a revolving field of nine hundred revolutions per minute with sixty-cycle current and sixteen pole pieces shown.

A squirrel-cage rotor 17 with twenty-four slots is shown. The twenty-four rotor slots and the sixteen stator pole pieces have an integral common factor eight. By reason of the twenty-four slots it will have a synchronous speed of three hundred revolutions per minute. As a synchronous motor has a tendency to lock at no speed, this synchronous characteristic is weakened by giving a slight twist in the alignment of the slots as shown of between one-quarter and three-quarters of a rotor slot pitch, and to overcome this locking, the squirrel cage is made of high resistance metal so that it will have a high starting torque, falling off as synchronous speed is approached sufficiently so as not to overcome the synchronous characteristic.

I claim:

1. A self-starting synchronous motor comprising a stator casing forming a part of the magnetic circuit, a stator coil enclosed by the casing, stator pole pieces inwardly projecting in pairs from each end of the casing, a metal plate with perforations for one pole piece of each pair at each end of the casing for providing a closed circuit around alternate pole pieces, and a cylindrical squirrel-cage rotor having a slight twist in the alignment of the rotor slots for weakening the locking tendency of the rotor at starting.

2. A self-starting synchronous motor comprising a stator casing forming a part of the magnetic circuit, a stator coil enclosed by the casing, stator pole pieces inwardly projecting in pairs from each end of the casing, a metal plate with perforations for one pole piece of each pair at each end of the casing for providing a closed circuit around alternate pole pieces, and a cylindrical squirrel-cage rotor with open rotor slots having a slight twist in the alignment, the number of rotor slots and stator pole pieces having an integral common factor.

3. A self-starting synchronous motor comprising a stator casing forming a part of the magnetic circuit, a stator coil enclosed by the casing, stator pole pieces inwardly projecting in pairs from each end of the casing, a metal plate with perforations for one pole piece of each pair at each end of the casing for providing a closed circuit around alternate pole pieces, and a cylindrical squirrel-cage rotor having a twist in its slot alignment of between one-quarter and three-quarters of a rotor-slot pitch.

MILLARD COLE SPENCER.